//

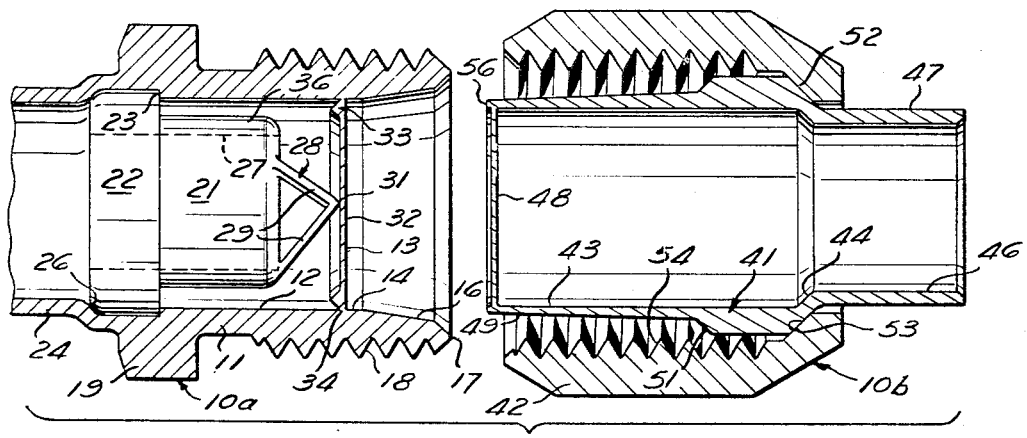
Fig. 1
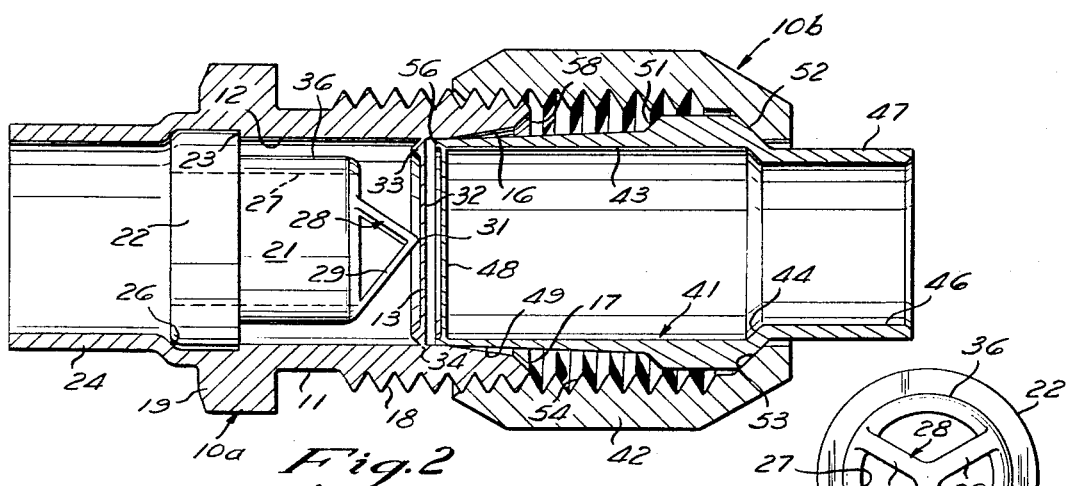
Fig. 2
Fig. 4
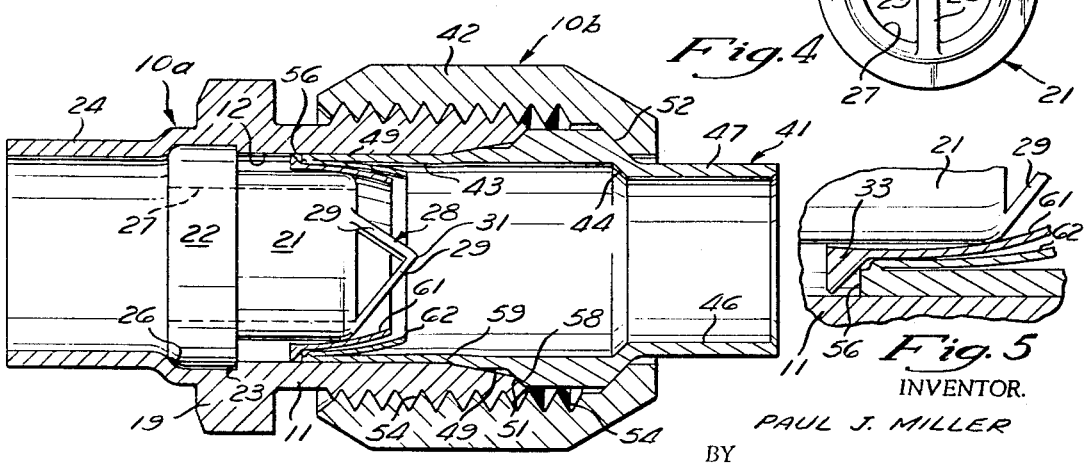
Fig. 3
Fig. 5
INVENTOR.
PAUL J. MILLER

United States Patent Office 3,391,951
Patented July 9, 1968

3,391,951
DIAPHRAGM SEALED COUPLING
Paul J. Miller, Maple Heights, Ohio, assignor to The Weatherhead Company, a corporation of Ohio
Filed Dec. 7, 1966, Ser. No. 599,753
11 Claims. (Cl. 285—3)

ABSTRACT OF THE DISCLOSURE

A couple including coupling halves each provided with an imperforate diaphragm which closes each coupling half prior to assembly. A cutter in one coupling half cuts both diaphragms during assembly to provide a flow connection through the coupling. Initial sealing is provided before cutting the diaphragms and the diaphragms and cutter are arranged to insure substantially unrestricted flow after assembly.

Background of invention

This invention relates generally to coupling assemblies of the type disclosed in the U.S. Letters Patent No. 3,285,627, dated Nov. 15, 1966. The present invention is directed to an improved structural arrangement for such coupling in which a diaphragm is cut and folded back substantially clear of the flow passage during the assembly of the two coupling halves.

Coupling of the type incorporating this invention are used extensively in pre-charged, sub-assemblies for refrigeration systems. Such sub-assemblies are usually charged with refrigerant during manufacture and are provided with coupling halves incorporating a sealing diaphragm. The coupling halves, thereafter, prevent escape of refrigerant and entry of contaminants prior to the assembly of the sub-assemblies into a complete system. During assembly of the coupling halves the diaphragms are ruptured to provide a fluid connection between the various sub-assemblies.

Summary of invention

The present invention provides an improved structural arrangement to provide an absolute seal of the coupling halves prior to assembly and to insure that upon assembly a substantially unrestricted flow connection is reliably provided.

In the illustrated embodiment of this invention, each coupling half is provided with a thin diaphragm integrally formed with the coupling body. The diaphragms extend across and close the associated flow passages within the coupling halves. A cutter is mounted on one of the coupling halves on the inner side of the associated diaphragm, and such associated diaphragm is provided with a peripheral rib adjacent to the wall of the passage. A relatively thin frangible portion extends around the rib and joins the diaphragm to the body and a relatively thin central portion is surrounded by the rib. The mating coupling half is provided with a forward end which constitutes a shear ring. During assembly of the two coupling halves, the shear ring engages the diaphragm adjacent to the rib and shears the diaphragm from the body along the frangible portion around the rib. Continued movement of the shear ring carries the ribbed diaphragm over the cutter, causing the cutter to pierce the central portion and fold it back clear of the passage.

The rib stiffens the diaphragm and performs a number of separate functions. First, it provides a thicker section adjacent to the frangible portion to insure that the diaphragm separates from the body at the desired location. Second, it provides a stiffening rib to support the diaphragm as it is moved over the cutter to insure that the diaphragm does not slip away from the shear ring or fold. This insures that the cutter pierces the center of the central portion. Third, it provides a ridge or flange engaged by the shear ring so that the diaphragm is properly carried over the cutter to fold the central portion back clear of the flow passage. Finally, it provides means to insure that the sheared diaphragm is locked in the desired position when the coupling operation is completed.

The cutter is arranged so that all of the central portion remains connected to the rib. Since the rib is positively locked in position at the completion of assembly all of the diaphragm parts are retained in the desired position and loose particles are not present.

The diaphragm in the other coupling half is supported around its periphery by the shear ring, so it is also pierced and properly carried over the cutter to fold its central portion back clear of the passage.

The illustrated coupling provides a simple, easily manufactured structure which functions with absolute reliability. The integrally formed diaphragms provide an absolute seal prior to assembly of the coupling halves. The structure of the diaphragms including the rib on the one diaphragm and its cooperation with cutter insures that the assembly of the two halves will produce exactly the desired cutting and folding back operation. Therefore, partial blocking of the flow passage cannot occur and all portions of the ruptured diaphragm remain in the desired location.

It is an important object of this invention to provide a novel and improved coupling structure including diaphragms operable to seal the coupling parts prior to assembly, in combination with cutting means operable to rupture the diaphragm during assembly of the coupling parts to provide a flow connection through the assembled coupling.

It is another object of this invention to provide a novel and improved coupling according to the preceding object wherein the diaphragm and cutting means are arranged to consistently insure the desired cutting so that substantially full flow is reliably provided in the assembled coupling.

It is another object of this invention to provide a novel and improved coupling according to the preceding objects wherein at least one diaphragm is joined to the coupling body by a frangible portion and is cleanly severed from the body of the coupling half around its periphery during the assembly of the coupling half.

It is still another object of this invention to provide a novel and improved coupling according to any of the preceding objects wherein the diaphragm is provided with a stiffening rib adjacent its periphery to support the diaphragm during the piercing thereof and to insure that piercing and cuttings operations are performed in the uniform manner.

FIGURE 1 is a side elevation partially in longitudinal section of a coupling incorporating the present invention illustrating the elements before the coupling halves are connected;

FIGURE 2 is a view similar to FIGURE 1 illustrating the elements in the position they assume when the coupling halves are partially connected and before the diaphragms are ruptured;

FIGURE 3 is a view similar to FIGURES 1 and 2 illustrating the elements of the two coupling halves at the completion of the coupling operation;

FIGURE 4 is an end view of the cutter element, and;

FIGURE 5 is an enlarged fragmentary section showing the positon of the diaphragms at the completion of the coupling operation.

In the illustrated embodiment each of the coupling halves 10a and 10b include a diaphragm to close or seal the coupling half prior to the assembly of the coupling. The coupling half 10a is formed with a body 11 having a central passage 12 closed at its forward end by an integrally formed diaphragm 13. Forward of the diaphragm 13 the body 11 is formed with a uniform diameter section 14 and a flaring portion 16 which extends to the end 17 of the coupling half. The exterior of the body 11 is formed with threads 18 and a polygonal wrenching section 19.

A cutter 21 is mounted in the body 11. In the illustrated embodiment the cutter is formed with an enlarged, rearward flange 22 which seats on its forward face against a shoulder 23 formed in the body 11. The body 11 is formed with a rearward tubular section 24 which is initially formed with a uniform diameter having an inner diameter sized to closely fit the exterior surface of the flange 22. After the cutter is positioned, as illustrated, the tubular portion 24 is deformed inward to provide a shoulder 26 engaging the rearward side of the flange 22 to lock the cutter 21 in position. The tubular portion 24 is connected in any suitable manner to the associated tubing or apparatus. Usually the connection between the tubular portion 24 and associated apparatus is accomplished by brazing or welding, since a permanent connection is desired.

The cutter 21 is formed with a central passage 27 and a cutter 28 at its forward end. The cutter 28 includes three symmetrical legs 29 which extend inwardly and are joined at a sharp point 31 at the center of the passage 12. The legs 29 are preferably relatively narrow, so they do not provide any substantial restriction to flow. Consequently, the passage 27 provides a flow path through the cutter for substantially unrestricted flow after the coupling halves are assembled.

The diaphragm 13 is formed with a central portion 32 which is substantially uniform in thickness and is relatively thin. A rib 33 is provided around the central portion 32 adjacent to the wall of the passage 12. In the illustrated embodiment this rib is triangular in section and is circular in shape. The actual junction between the body 11 and the diaphragm 13 is provided by a thin, frangible section 34 extending around the rib 33.

Prior to asembly of the coupling halves the sharp cutting end 31 is immediately adjacent to the inner side of the diaphragm 32. The cutter 21 includes a tubular section 36 between the cutting end 28 and the flange 22. The periphery of this tubular portion 36 is spaced inwardly from the wall of the passage 12 to provide an annular space which receives the diaphragms after the coupling operation is completed.

The coupling half 10b is formed with a tubular body 41 and a nut 42. The body 41 is formed with a forward tubular section having a central passage 43 which in the illustrated embodiment has a uniform diameter extending back to a reducing diameter shoulder 44. Extending rearwardly from the shoulder 44 is a reduced diameter passage 46 which is open to the rearward end of the tubular section 47. Here again, the tubular section 47 is adapted to be connected, preferably by welding or brazing, to the associated tubing or to the associated apparatus.

The forward end of the passage 43 is closed by a uniform wall thickness, integrally formed diaphragm 48. This diaphragm provides a seal closing the passage 43 prior to the assembly of the two coupling halves. The exterior of the forward end of the body 41 is formed with a long taper 49 extending from the forward end of the body 43 to a conical section 51. Rearwardly of the conical section 51 is an opposed conical section 52 which serves as an abutment for the mating shoulder 53 on the nut 42. The nut is provided with internal threads 54 which mate with the threads 18 on the body 11. The forward end of the body 41 constitutes a shear ring 56 which shears the diaphragm 13 from the body 11 during the assembly of the coupling.

During the initial portion of the assembly of the two coupling halves 10a and 10b the elements move to the position of FIGURE 2. At this point in the assembly the nut has been threaded onto the forward end of the body 11 and the shear ring 56 is approaching the diaphragm 13. The tapered outer wall 49 on the body 41 engages the portion 14 of the body 11 with an interference fit, so a fluid-tight seal is formed between the two bodies 11 and 41 prior to any cutting of the diaphragms 13 and 48. During continued assembly, the nut 42 is threaded further onto the body 11 causing the shear ring 56 to engage the periphery of the diaphragm 13 opposite the rib 33.

Continued assembly then causes the shear ring 56 to shear the frangible portion 34 all the way around the rib 33 and separate the diaphragm 13 from the body 11. Thereafter the diaphragm 13 is carried inward as a single unit by continued assembly. The rib 33 stiffens the diaphragm 13 so that it does not slip inside the shear ring 56 and insures that the diaphragm does not fold.

Continued assembly causes the diaphragm 13 to be carried over the sharp point 31 causing the point to pierce the center portion of the diaphragm. The three legs 29 of the cutter then enlarge the central opening to cause the central portion 32 to be cut into sections or leaves 61 which bend back as the coupling operation progresses. Because of the exterior taper at 49 a tight seal is maintained between the forward end of the body 41 and the body 11 to prevent the escape of any of the charging fluid.

FIGURES 3 and 5 illustrate the position the elements assume at the completion of the assembly operation. At this point the conical surface 51 engages a conical end 58 on the body 11 to provide a permanent seal between the two body elements. Additional sealing is provided by the engagement at 59 on the body 11 with the tapered wall 49. It should be noted that the tapered wall is swaged inward during the assembly and provides a good seal during the entire assembly operation. The engagement of the two conical surfaces 51 and 58 causes the coupling to bottom so that the wrenching torque increases sharply to indicate that the coupling operation is completed. At this time the diaphragm 13 has been carried by the shear ring 56 into the clearance around the tubular section 36 and the leaves 61 formed by the cutter 21 are folded back substantially adjacent to the wall of the passage 43.

After the cutting point 31 pierces the diaphragm 13 it also pierces the diaphragm 48 and again cuts the diaphragm into inwardly extending leaves 62. The surrounding tubular section of the body 41 supports the periphery of the diaphragm 48 and insures proper cutting. Here again, the leaves 62 are folded back adjacent to the wall of the passage 43. When the coupling operation is completed the peripheries of the diaphragms are carried along the tubular section a distance substantially equal to one half the radius of the diaphragms. This insures that the leaves 61 and 62 are folded back substantially clear of the central passage 27 and do not obstruct flow through the assembled coupling.

The rib 33 performs a number of separate functions. First, it provides a large section around the diaphragm adjacent to the wall of the passage 12 to clearly establish the frangible portion 34. This insures that the diaphragm will be sheared cleanly from the body 11 all of the way around the passage 12. After the initial rupture or shearing of the frangible portion 34 the rib provides stiffening to give the diaphragm hoop strength as it is carried over the cutter 28. Consequently, the diaphragm does not fold down and is retained in exactly the desired position ahead of the shear ring. After this occurs the rib 33 provides a shoulder, best illustrated in FIGURE 5, against which the shear ring 56 engages so that it carries the diaphragm cleanly and uniformly along the cutter to the final position illustrated. Because of the longitudinal forces developed on the diaphragm by the cutter, the rib 33 turns through about 45° to the position illustrated in FIGURE 5. In this position it still provides a shoulder for engagement by the shear ring 56. When the assembly is completed, the rib 31 and in turn the sheared diaphragm 13 is trapped in the desired position by the cutter 21, the body 11, and the shear ring 56. Therefore, there is no danger of loss of control of the cut diaphragm.

Those skilled in the art will recognize that with a coupling incorporating the present invention substantially perfect sealing of the coupling halves is achieved prior to the connection of the two coupling halves. Also during the coupling operation uniform piercing and shearing of the diaphragms occurs. Finally, at the completion of the coupling operation the diaphragm parts are folded back by the tubular section 36 clear of the passage to insure substantially unrestricted flow through the two coupling halves of the assembled coupling. Reliability of sealing is provided and reliability of flow is insured after the coupling operation is completed.

Although a preferred embodiment of this invention is illustrated, it is to be understood that various modifications and rearrangements of parts may be resorted to without departing from the scope of the invention disclosed and claimed herein.

I claim:

1. A coupling comprising a coupling assembly including a body formed with a passage therein, a diaphragm in said body extending across and closing said passage, said diaphragm including a central portion, peripheral stiffening means, and a frangible portion supporting said diaphragm in said body, said peripheral stiffening means located radially inwardly of said frangible portion and adjacent thereto, a cutter in said body on one side of said diaphragm, and a mating part adapted to seal with said coupling assembly and formed with an annular surface adapted to engage said diaphragm adjacent to said stiffening means and move said diaphragm relative to said body and cutter to rupture said frangible portion and carry said diaphragm over said cutter until said central portion is cut to permit flow through said passage, said stiffening means preventing collapse of the periphery of said diaphragm as the diaphragm is carried over said cutter.

2. A coupling as set forth in claim 1 wherein said diaphragm is integrally formed with said body and is connected thereto by said frangible portion.

3. A coupling as set forth in claim 1 wherein said stiffening means is a rib having a thickness substantially greater than the thickness of said central portion and said frangible portion, and said annular surface engages said diaphragm adjacent said rib.

4. A coupling as set forth in claim 3 wherein said rib extends completely around said diaphragm.

5. A coupling as set forth in claim 3 wherein said rib is triangular in section.

6. A coupling as set forth in claim 3 wherein said rib forms a radial extending shoulder, and said annular surface engages said shoulder as it carries said diaphragm over said cutter.

7. A coupling as set forth in claim 6 wherein said cutter is provided with a tubular portion having cutting edges adjacent one end, said tubular portion being spaced inwardly from the wall of said passage to provide an annular space proportioned to receive said rib and said annular surface when said annular surface carries said diaphragm over said cutter.

8. A coupling as set forth in claim 7 wherein said cutting edges cut said central portion into a plurality of separate leaves joined to said rib, and said tubular portion folds said leaves back substantially clear of the opening in said tubular portion.

9. A coupling as set forth in claim 1 wherein said mating part is provided with a second body having a second passage therein, and a shear ring providing said annular surface, and a second diaphragm extending across said second passage substantially adjacent to said shear ring closing said second passage, said second diaphragm being carried over said cutter as said shear ring carries said first diaphragm over said cutter.

10. A coupling as set forth in claim 9 wherein said cutter is formed with a tubular portion with cutting edges adjacent one end, and the peripheries of said diaphragms are carried along said tubular portion a substantial distance when the coupling is completed.

11. A coupling as set forth in claim 10 wherein said substantial distance is at least substantially equal to one half the radius of said diaphragms.

References Cited

UNITED STATES PATENTS

| 1,959,822 | 5/1934 | Greve. |
| 2,516,159 | 7/1950 | Stroop. |
| 2,813,568 | 11/1957 | Kilmarx. |
| 3,201,148 | 8/1965 | Shurtleff. |
| 3,202,442 | 8/1965 | Abbey et al. |
| 3,285,627 | 11/1966 | Kozulla et al. |

FOREIGN PATENTS

| 1,207,428 | 9/1959 | France. |

CARL W. TOMLIN, *Primary Examiner.*

D. W. AROLA, *Assistant Examiner.*